US008027455B2

(12) United States Patent
Moody et al.

(10) Patent No.: US 8,027,455 B2
(45) Date of Patent: *Sep. 27, 2011

(54) RINGBACKS BASED ON EXTRINSIC INFORMATION

(75) Inventors: Taryn Moody, Atlantic Highlands, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1119 days.

This patent is subject to a terminal disclaimer.

(21) Appl. No.: 11/028,967

(22) Filed: Jan. 4, 2005

(65) Prior Publication Data

US 2006/0147017 A1  Jul. 6, 2006

(51) Int. Cl.
*H04M 3/00* (2006.01)
(52) U.S. Cl. .............. 379/257; 379/201.01; 379/202.02; 379/911; 455/401
(58) Field of Classification Search ............. 379/207.08, 379/207.16, 257, 114.13, 418, 252, 911, 379/201.01, 201.02, 38–39; 455/401; 340/503
See application file for complete search history.

(56) References Cited

U.S. PATENT DOCUMENTS

| 5,926,537 | A | 7/1999 | Birze | |
|---|---|---|---|---|
| 7,010,112 | B2 * | 3/2006 | Lee et al. | 379/207.16 |
| 7,142,645 | B2 * | 11/2006 | Lowe | 379/88.16 |
| 7,227,929 | B2 * | 6/2007 | Seelig et al. | 379/67.1 |
| 7,248,677 | B2 * | 7/2007 | Randall et al. | 379/93.23 |
| 2003/0000522 | A1 * | 1/2003 | Lynn et al. | 128/200.24 |
| 2003/0064748 | A1 * | 4/2003 | Stulberger | 455/556 |
| 2003/0096593 | A1 * | 5/2003 | Naboulsi | 455/411 |
| 2003/0110450 | A1 * | 6/2003 | Sakai | 715/529 |
| 2003/0174830 | A1 * | 9/2003 | Boyer et al. | 379/265.02 |
| 2003/0208754 | A1 * | 11/2003 | Sridhar et al. | 725/34 |
| 2004/0114732 | A1 * | 6/2004 | Choe et al. | 379/88.17 |
| 2004/0120493 | A1 | 6/2004 | Creamer et al. | |
| 2004/0132435 | A1 | 7/2004 | No et al. | |
| 2005/0078812 | A1 * | 4/2005 | Batni et al. | 379/207.16 |
| 2005/0105706 | A1 * | 5/2005 | Kokkinen | 379/201.01 |

(Continued)

FOREIGN PATENT DOCUMENTS

JP  2000-253111 A  9/2000

(Continued)

OTHER PUBLICATIONS

Kharif, Olga, America, Get Ready for "Ringbacks", Business Week Online, Jun. 28, 2004, Online: http://businessweek.com/print/technology/content/jun2004/tc20040628_0965_tc119.htm.

*Primary Examiner* — Ahmad F Matar
*Assistant Examiner* — Antim Shah

(57) ABSTRACT

An apparatus and methods are disclosed that enable a first user of a telecommunications terminal to receive, upon placing a call to a second user, a ringback signal that is based on information that is extrinsic to the telecommunications system that handles the call (i.e., information that is independent of the state of the telecommunications system). Such extrinsic information might include: entries in a user schedule (e.g., from a groupware application such as Lotus Notes® that is hosted on a server, from a personal digital assistant [PDA] calendar, etc.); environmental parameters at the first and/or second user's terminal (e.g., temperature, ambient sound pressure, ambient luminosity, etc.); physiological parameters of the first and/or second users (e.g., heart rate, respiration rate, body temperature, brain activity, etc.); stock ticker information; weather forecasts; sports scores; updated election results; and so forth.

10 Claims, 15 Drawing Sheets

U.S. PATENT DOCUMENTS

| | | | |
|---|---|---|---|
| 2005/0163302 A1* | 7/2005 | Mock et al. | 379/211.02 |
| 2005/0169446 A1* | 8/2005 | Randall et al. | 379/93.23 |
| 2005/0171843 A1* | 8/2005 | Brazell et al. | 705/14 |
| 2006/0003813 A1* | 1/2006 | Seligmann et al. | 455/567 |
| 2006/0023862 A1* | 2/2006 | Sutcliffe | 379/257 |
| 2006/0109102 A1* | 5/2006 | Gortz et al. | 340/531 |
| 2006/0147021 A1* | 7/2006 | Batni et al. | 379/221.08 |
| 2006/0234635 A1* | 10/2006 | Riordan et al. | 455/67.11 |
| 2007/0116251 A1* | 5/2007 | Seo | 379/372 |

FOREIGN PATENT DOCUMENTS

| | | | |
|---|---|---|---|
| JP | 2001-007902 A | | 1/2001 |
| JP | 2001-168952 A | | 6/2001 |
| JP | 2001-274867 A | | 10/2001 |
| JP | 2002111853 A | * | 4/2002 |
| JP | 2003-47043 A | | 2/2003 |
| JP | 2003-69662 A | | 3/2003 |
| JP | 2003-218999 A | | 7/2003 |

* cited by examiner

RINGBACKS BASED ON EXTRINSIC INFORMATION

FIELD OF THE INVENTION

The present invention relates to telecommunications in general, and, more particularly, to techniques for generating ringback signals.

BACKGROUND OF THE INVENTION

FIG. 1 depicts telecommunications system 100 comprising originating telecommunications terminal 101 (e.g., a wireless telephone, a wireline telephone, a personal digital assistant [PDA], etc.), terminating telecommunications terminal 105, data-processing system 102 (e.g., a switch, a router, a private branch exchange [PBX], etc.), data-processing system 104, and network 103 (e.g., the Public Switched Telephone Network [PSTN], the Internet, a cellular wireless network, etc.) in accordance with the prior art. Telecommunications terminal 101 is capable of placing calls (e.g., voice calls, video calls, text messaging sessions, etc.) to other telecommunications terminals, and telecommunications terminal 105 is capable of receiving calls from other telecommunications terminals. When telecommunications terminal 101 places a call to telecommunications terminal 105, the call is set up via data-processing system 102, network 103, and data-processing system 104, as described below and with respect to FIG. 2.

FIG. 2 depicts a message-flow diagram for the placing of a call from telecommunications terminal 101 to telecommunications terminal 105. In this call scenario, telecommunications terminal 101 is known as the originating terminal, and telecommunications terminal 105 is known as the terminating terminal. Similarly, data-processing system 102 is known as the originating data-processing system, and data-processing system 104 is known as the terminating data-processing system.

At event 201, originating terminal 101 transmits a call-origination signal to originating data-processing system 102 via network 103.

At event 202, originating data-processing system 102 receives the call origination signal.

At event 203, originating data-processing system 102 allocates one or more resources for the call. For example, if originating data-processing system 102 is a router, it might allocate a route in its route table and associate the route with the call. If originating data-processing system 102 is a switch, it might allocate a trunk, and associate the trunk with the call.

At event 204, originating data-processing system 102 transmits a call-setup signal to terminating data-processing system 104 via network 103.

At event 205, terminating data-processing system 104 receives the call-setup signal.

At event 206, terminating data-processing system 104 allocates one or more resources for the call.

At event 207, terminating data-processing system 104 transmits an acknowledgment to originating data-processing system 102 via network 103.

At event 208, originating data-processing system 102 receives the acknowledgment transmitted at event 207.

At event 209, terminating data-processing system 104 generates a ringback signal. The ringback is intended to let the user of originating terminal 101 know that terminating terminal 105 is alerting its user of the incoming call (i.e., that terminal 105 is "ringing").

At event 210, terminating data-processing system 104 transmits the ringback signal to originating data-processing system 102 via network 103.

At task 211, originating data-processing system 102 receives the ringback signal.

At task 212, originating data-processing system 102 transmits the ringback signal to originating terminal 101, which receives the ringback at task 213. The ringback signal is typically a periodic "ringing" sound. The ringback signal continues to "ring" until the call is answered (e.g., when the user of terminal 105 answers the call, when a voice mail system answers the call, etc.) or until the user of originating terminal 101 decides to end the attempted call (i.e., "hangs up").

In parallel with tasks 211 and 212, terminating data-processing system 104 transmits at task 214 a ringtone to terminating terminal 105, and terminating terminal 105 receives the ringtone at task 215. The ringtone notifies the user of terminal 105 of the arrival of a call (e.g., via a "ringing" sound, via a tune, etc.).

Some wireless telecommunications service providers offer a premium ringback service to their subscribers, in which the subscriber can associate with their phone a particular ringback (e.g., a song, a sequence of tones, etc.) that will be played to the calling party whenever the subscriber is called on the associated phone. As an option, the subscriber can also associate a different ringback with each of several calling party numbers that the subscriber identifies when programming the ringback service.

Customizable ringbacks have become a popular feature with teenagers in some countries (e.g., Republic of Korea, etc.) because of its "cool factor" and because it enables subscribers to express their individuality. Telecommunications service providers also find such ringback services desirable because they are able to collect additional fees for the service, and they can lure customers away from service providers that do not offer the service. Furthermore, customizable ringbacks can potentially improve what callers experience while waiting for the called subscribers to answer the calls.

SUMMARY OF THE INVENTION

The present invention enables a user $U_1$ of a telecommunications terminal to receive, upon placing a call to a remote user $U_2$, a ringback signal that is based on information that is extrinsic to the telecommunications system that handles the call (i.e., information that is independent of the state of the telecommunications system). Such extrinsic information might include:

i. entries in a user schedule (e.g., from a groupware application such as Lotus Notes® that is hosted on a server, from a personal digital assistant [PDA] calendar, etc.),
 ii. environmental parameters at user $U_1$'s or user $U_2$'s terminal (e.g., temperature, ambient sound pressure, ambient luminosity, etc.),
 iii. physiological parameters of user $U_1$ or user $U_2$ (e.g., heart rate, respiration rate, body temperature, brain activity, etc.),
 iv. stock ticker information,
 v. weather forecasts,
 vi. sports scores, or
 vii. updated election results.

For example, when user $U_1$ calls user $U_2$, user $U_1$ might hear:

the Beatles song "Dr. Robert" as the ringback when user $U_2$ has a doctor's appointment scheduled at that time, the Rolling Stones song "Street Fighting Man" as the ringback when user $U_2$'s son Keith has a martial arts lesson scheduled at that time (user $U_2$ typically drives Keith to the martial arts studio and watches the lesson), the Connie Francis song "Vacation" as the ringback when user $U_1$, who works at Acme Industries, is on paid leave (perhaps indicated by a timekeeping software application schedule) and user $U_2$ is also an Acme employee, the Beatles song "Good Day Sunshine" as the ringback when it is forecasted to be sunny at user this geo-location, the Foreigner song "Hot Blooded" as the ringback when user $U_2$ has a high body temperature, or the song "We're In The Money" from the musical $42^{nd}$ Street as the ringback when a particular stock has risen 10% or more during that day's trading session, the song "Take Me Out to the Ballgame" as the ringback when the New York Yankees have the lead in today's game, or the song "Yellow Rose of Texas" as the ringback during election night when George W. Bush is ahead in the electoral college.

As another example, a vice president of Bank of New York who uses a company notebook computer to place a Voice over IP (VoIP) call might hear Liza Minelli's rendition of "New York, N.Y." as the ringback when Bank of New York stock is up today, while the company's Chairman might hear Frank Sinatra's rendition of "New York, N.Y." as the ringback when placing a call with the same computer.

Furthermore, in the illustrative embodiments of the present invention, one or more properties of a particular ringback song might be set based on extrinsic information. For example, the song might be played:

i. at a louder volume when the called user is at a sports event, as indicated in a schedule, ii. at a faster tempo when the called user's heart rate is abnormally high, iii. an instrumental version when the temperature at the calling user is below 32 degrees Fahrenheit, iv. with a higher pitch instead of a lower pitch when a particular stock is up during the trading session, or v. with a lively rhythm when the New York Jets won today's football game.

In accordance with the illustrative embodiments of the present invention, a data-processing system (e.g., an originating switch, a terminating switch, a wireless base station, a server, etc.) that receives a call-setup signal consults a database that dynamically keeps track of extrinsic information (e.g., obtained from scheduling applications, stock tickers, news feeds, etc.) and generates a ringback signal that is based on this information. A ringback signal might comprise any combination of an audio clip, an image, a text string, and a video clip. The data-processing system generates the ringback signal by one or both of:

i. selecting a particular song, image, etc. based on extrinsic information, and ii. setting the value of a particular property of a ringback signal (e.g., the tempo of a song, the size of an image, the font of a text string, etc.) based on extrinsic information.

As will be appreciated by those skilled in the art, modifying the values of properties such as volume and tempo does not change the fundamental identity of the song. In other words, the melody of the song is independent of these properties and, therefore, the song remains recognizable. Similarly, the semantic content of an image, text string, or video clip is independent of the values of properties such as brightness, size, resolution, etc.

An illustrative embodiment of the present invention comprises: generating at a data-processing system a ringback signal that is based on the contents of a schedule for one or more persons.

DETAILED DESCRIPTION

The terms appearing below are given the following definitions for use in the specification and appended claims.

For the purposes of the specification and claims, the term "ringback signal" is defined as a signal that (i) is received by a caller after placing a call, and (ii) indicates that the called terminal is ringing, or is about to ring. The ringback signal might be an audible signal, a visual signal, or a tactile stimulus.

For the purposes of the specification and claims, the term "call log" is defined as a record of call activity that comprises at least one of:
  i. Calls made and completed (i.e., "incoming calls") to one or more telecommunications terminals;
  ii. Calls originating (i.e., "outgoing calls") from one or more telecommunications terminals; and
  iii. Calls made, but not completed (i.e., "missed calls") to one or more telecommunications terminals.

For the purposes of the specification and claims, the term "musical composition" is defined as either a piece of music or a sound effect (e.g., one or more beeps, etc.).

For the purposes of the specification and claims, the term "calendrical time" is defined as indicative of one or more of the following:
  (i) a time (e.g., 16:23:58, etc.),
  (ii) one or more temporal designations (e.g., Tuesday, November, etc.),
  (iii) one or more events (e.g., Thanksgiving, John's birthday, etc.), and
  (iv) a time span (e.g., 8:00 PM to 9:00 PM, etc.).

Figure 1:
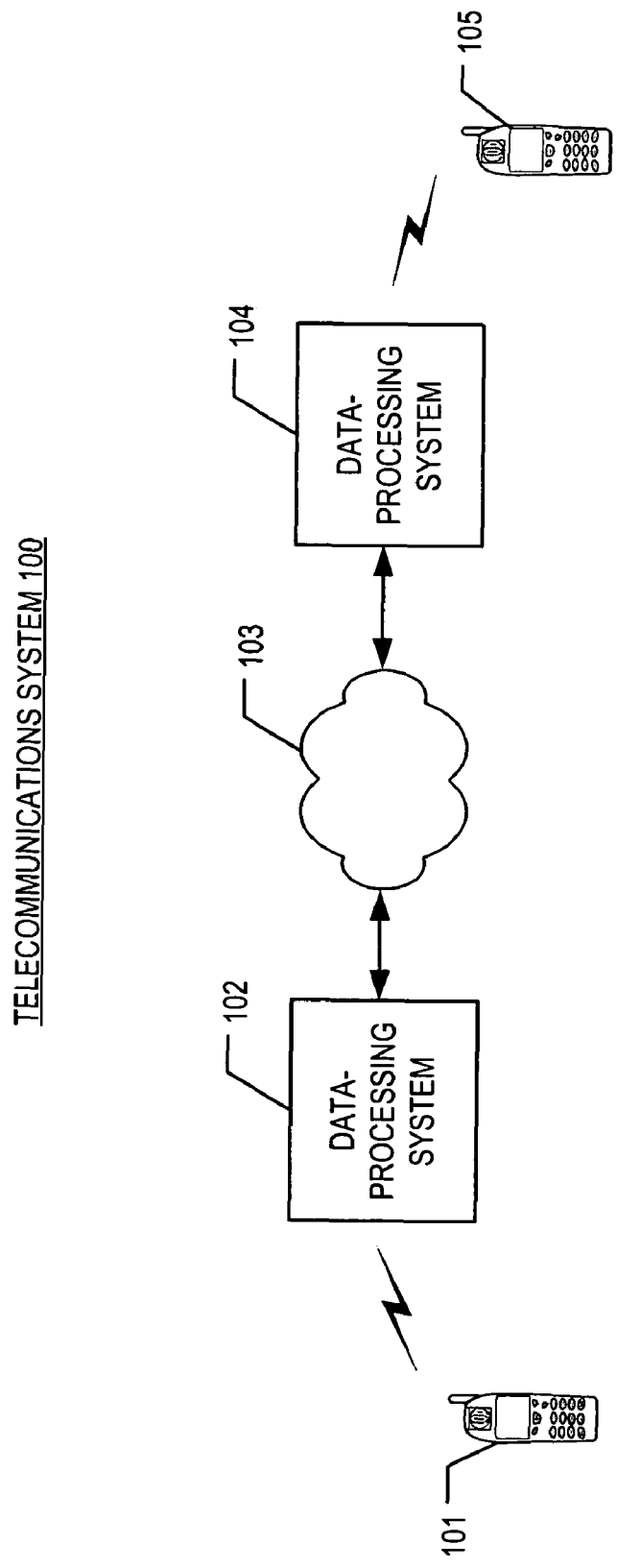
FIG. 1 depicts telecommunications system 100 in the prior art.
Figure 2:
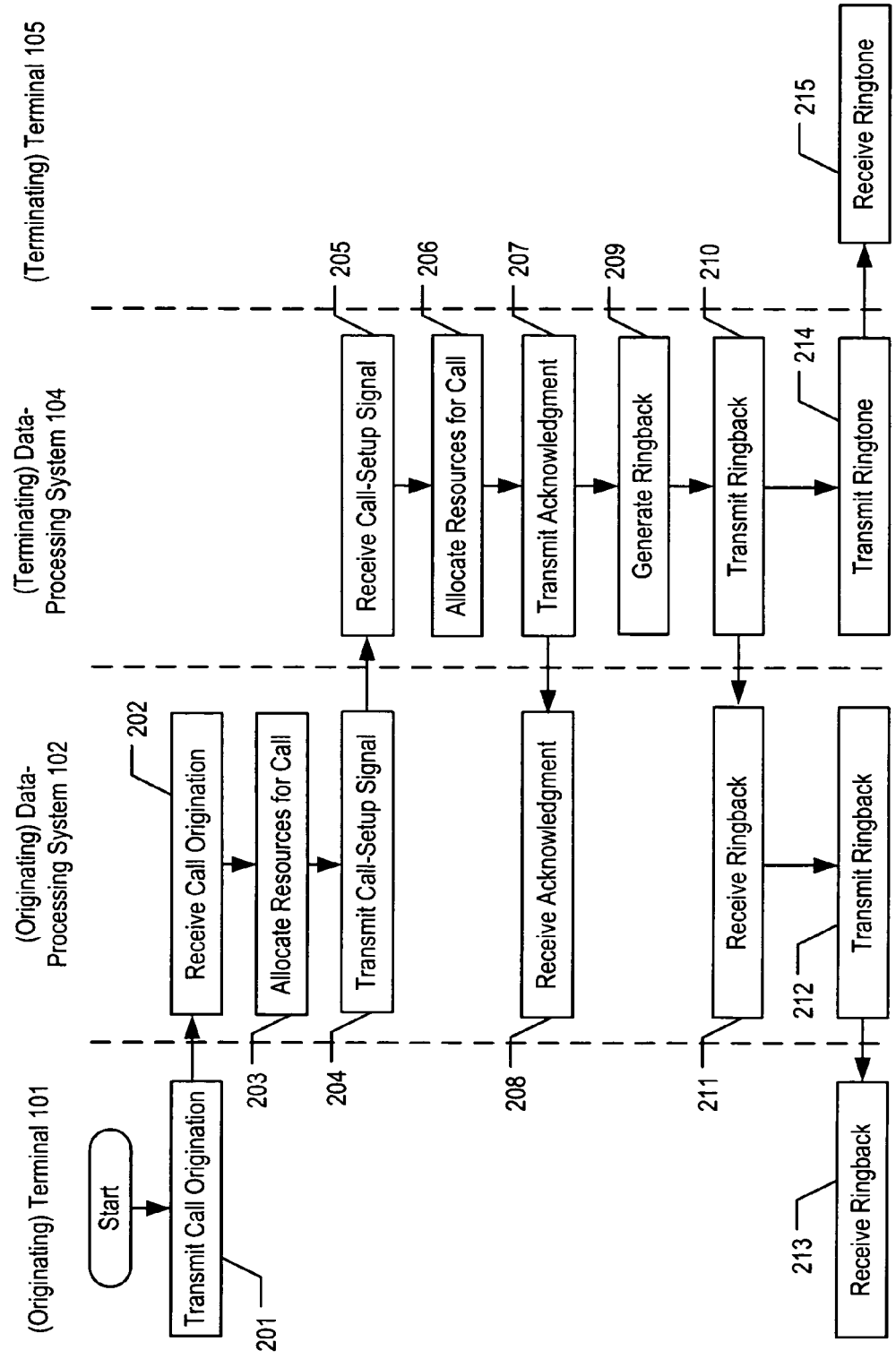
FIG. 2 depicts a flow diagram of the tasks associated with generating a ringback in the prior art.
Figure 3:
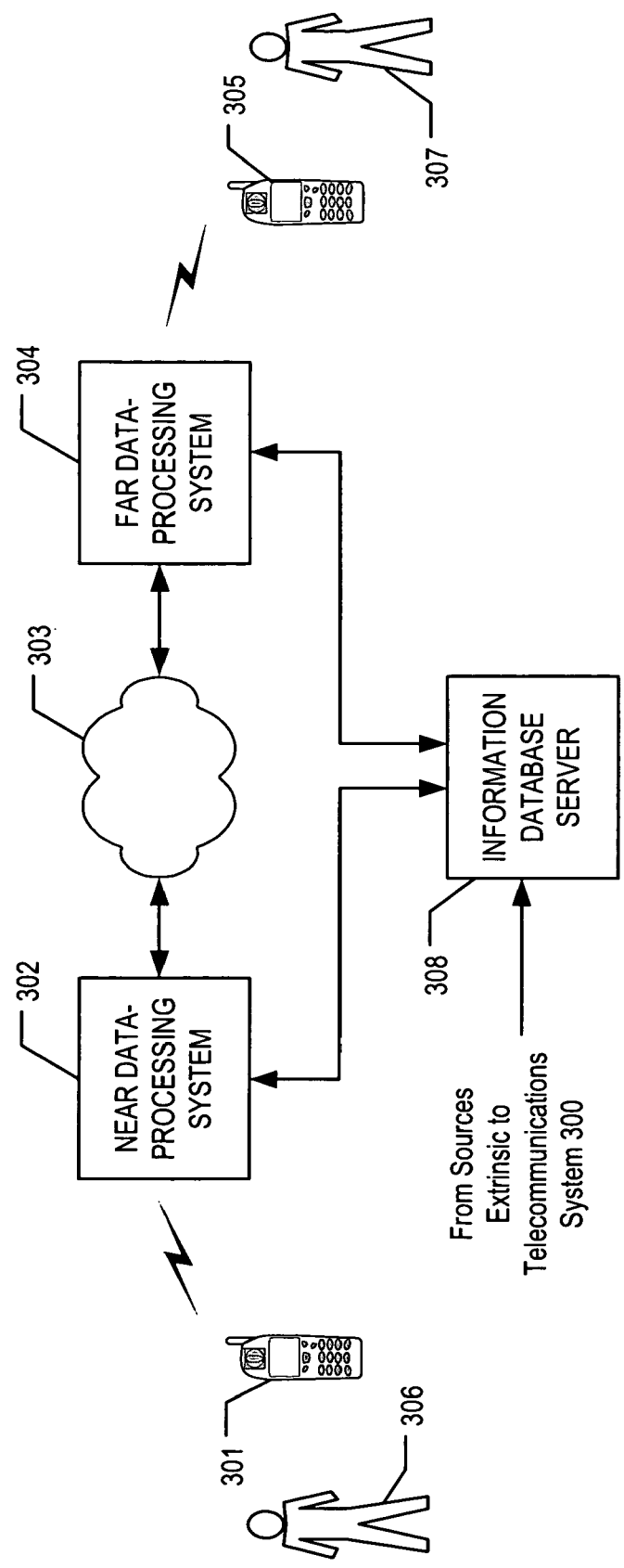
FIG. 3 depicts telecommunications system 300, in accordance with the illustrative embodiments of the present invention.

FIG. 3 depicts telecommunications system 300 in accordance with the illustrative embodiments of the present invention. Telecommunications system 300 comprises telecommunications terminals 301 and 305, near data-processing system 302, network 303, far data-processing system 304, and information database server 308, interrelated as shown. The terms "near" and "far" are meant to indicate the relative positions of near data-processing system 302 and far data-processing system 304 with respect to telecommunications terminal 301. Telecommunications terminal 301 is associated with user 306 (also referred to as "user $U_1$"), and telecommunications terminal 305 is associated with user 307 (also referred to as "user $U_2$").

Telecommunications terminals 301 and 305 communicate with each other via near data-processing system 302, network 303, and far data-processing system 304 in well-known fashion. Telecommunications terminal 301 is capable of placing a call to telecommunications terminal 305, and telecommunications terminal 305 is capable of receiving a call from telecommunications terminal 301. It will be clear to those skilled in the art how to make and use telecommunications terminals 301 and 305.

Data-processing systems 302 and 304 enable terminals 301 and 305 to communicate with each other by connecting (e.g., electrically, optically, etc.) one terminal to the other terminal and by passing signals between the terminals in well-known fashion. In particular, near data-processing system 302 receives call-setup signals that originate from terminal 301 and passes call-setup signals to far data-processing system 304. Far data-processing system 304 notifies terminal 305 of the incoming call via a ringtone signal, in well-known fashion. Data-processing systems 302 and 304 further provide selectable and changeable connectivity from one or more inputs to one or more outputs by accommodating the necessary control signaling and traffic handling capabilities. In accordance with the illustrative embodiments of the present invention, data-processing systems 302 and 304 are telecommunications switches. As will be appreciated by those skilled in the art, in some other embodiments one or both of data-processing systems 302 and 304 might be servers, routers, etc.

As will further be appreciated by those skilled in the art, although in illustrative telecommunications system 300 near data-processing system 302 is an originating data-processing system with respect to telecommunications terminal 301 (i.e., there are no other data-processing systems between terminal 301 and data-processing system 302), in some other embodiments there might be an originating data-processing system between terminal 301 and near data-processing system 302. Similarly, in illustrative telecommunications system 300, far data-processing system 304 is a terminating data-processing system with respect to telecommunications terminal 305, but in some other embodiments there might be a terminating data-processing system between terminal 305 and far data-processing system 304.

In accordance with first illustrative embodiment of the present invention, far data-processing system 304 also monitors its associated telecommunications terminals and users (e.g., terminal 305, user 307, etc.), exchanges information with information database server 308, and generates a ringback signal for the calling telecommunications terminal (e.g., terminal 301, etc.) based on the information received from server 308, as described in detail below and with respect to FIGS. 8 through 10. Further in accordance with the first illustrative embodiment, near data-processing system 302 passes the ringback signal along to terminal 301.

In accordance with the second illustrative embodiment of the present invention, near data-processing system 302 also monitors its associated telecommunications terminals and users (e.g., terminal 301, user 306, etc.), exchanges information with information database server 308, and generates a ringback signal to the calling telecommunications terminal (e.g., terminal 301, etc.) based on the information received from server 308, as described in detail below and with respect to FIGS. 11 through 13. Further in accordance with the second illustrative embodiment, near data-processing system 302 might receive a ringback signal generated by far data-processing system 306. If this is the case, near data-processing system 302 might ignore the ringback signal.

Although near data-processing system 302 is depicted in FIG. 3 as the data-processing system closest to terminal 301, it will be clear to those skilled in the art, after reading this specification, how to make and use other embodiments of telecommunications system 300 in which one or more networking elements are located between terminal 301 and near data-processing system 302.

It will be clear to those skilled in the art, after reading this specification, how to make and use data-processing systems 302 and 304.

Network 303 provides connectivity between data-processing system 302 and data-processing system 304, in well-known fashion. As is well-known in the art, network 303 typically comprises one or more networking elements such as switches, routers, hubs, etc. In some embodiments network 303 might comprise one or more of: the Public Switched Telephone Network (PSTN), the Internet, a local area network (LAN), a cellular network, etc. It will be clear to those skilled in the art how to make and use network 303.

User 306 (i.e., user $U_1$) and user 307 (i.e., user $U_2$) are the users of telecommunications terminals 301 and 305, respectively. In some embodiments of the present invention, one or both of telecommunications terminals 301 and 305 might be associated with a unique user, while in some other embodiments, one or both of telecommunications terminals 301 and 305 might be available to a plurality of users. As will be appreciated by those skilled in the art, in the latter case a user might identify himself or herself to a terminal by a variety of methods, such as initially logging in to the terminal, inserting a personalized Single In-line Memory Module (SIMM) card into a memory slot of the terminal, etc. Furthermore, in some embodiments a user might use a plurality of telecommunications terminals.

Information database server 308 stores dynamic information pertaining to telecommunications terminals and their users in well-known fashion. Such information might include one or more of the following:

i. the geo-locations of terminals,
ii. call logs associated with terminals, users, or both,
iii. user schedules,
iv. environmental parameters at terminals (e.g., temperature, ambient sound pressure, ambient luminosity, etc.), or
v. physiological parameters of terminal users (e.g., heart rate, respiration rate, body temperature, brain activity, etc.).

In addition, information database server 308 also stores dynamic information that is extrinsic to telecommunications system 300, in well-known fashion. Such information might include one or more of the following:

i. a stock ticker,
ii. updated sports scores, or
iii. updated election results.

Information database server 308 receives this information from i. elements that are part of telecommunications system 300 (e.g., data processing system 304, telecommunications terminals 301 and 305, etc.), and
ii. sources that are extrinsic to telecommunications system 300 (e.g., weather services, stock tickers, etc.), and provides the information to one or both of data-processing systems 302 and 304, in well-known fashion. As will be appreciated by those skilled in the art, in some embodiments the information might be transmitted from information database server 308 to data-processing systems 302 and 304 via additional networking elements of telecommunications system 300.

It will be clear to those skilled in the art, after reading this specification, how to make and use information database server 308. In addition, although FIG. 3 depicts data-processing systems 302 and 304 as separate elements that are both connected to information database server 308, it will be clear to those skilled in the art, after reading this specification, how to make and use telecommunications system 300 with a single data-processing system that serves both telecommunications terminals 301 and 305.

Figure 4:
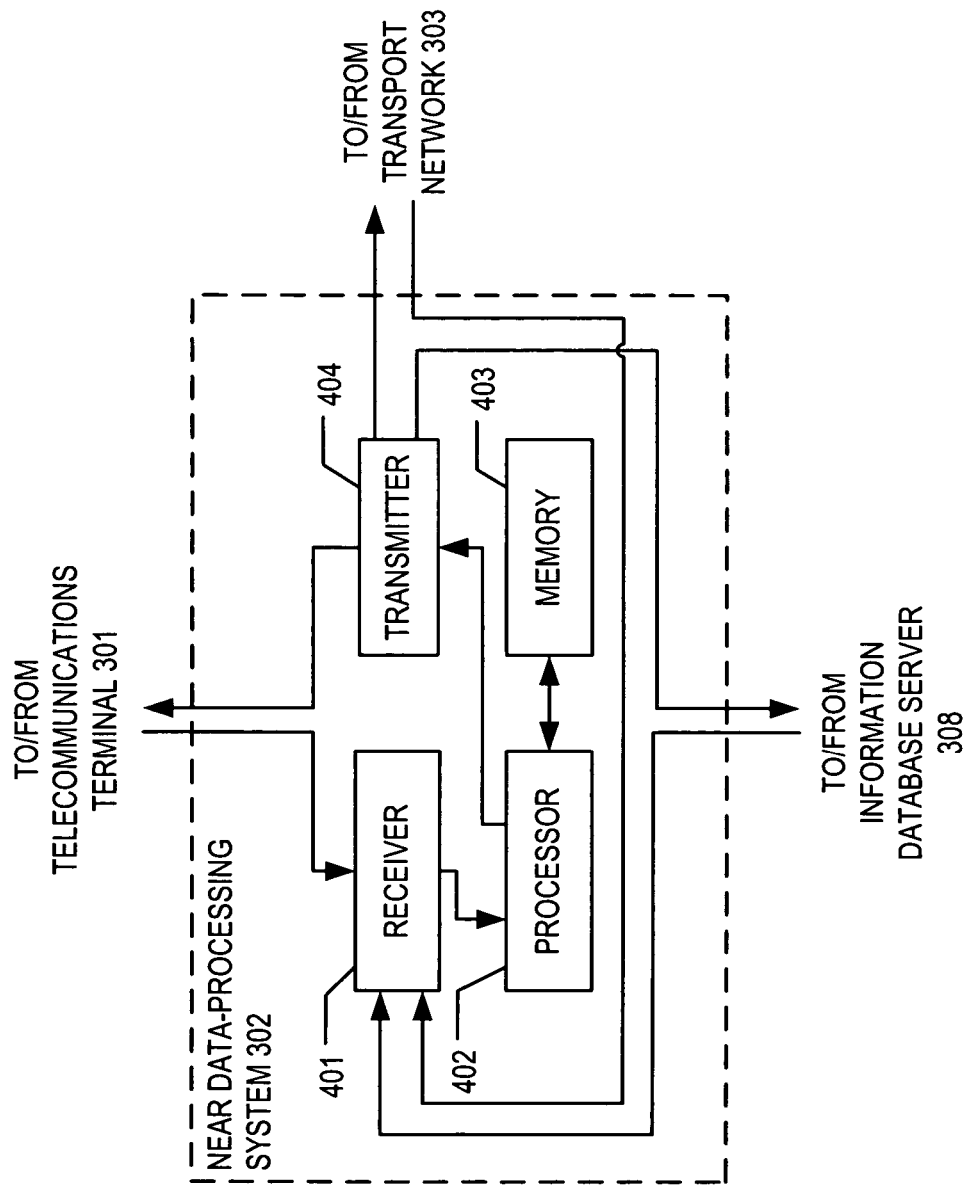
FIG. 4 depicts near data-processing system 302, in accordance with the illustrative embodiments of the present invention.

FIG. 4 depicts near data-processing system 302, in accordance with the illustrative embodiments of the present invention. Near data-processing system 302 comprises receiver 401, processor 402, memory 403, and transmitter 404, interconnected as shown.

Receiver 401 receives signals from telecommunications terminal 301, network 303, and information database server 308, and forwards the information encoded in these signals to processor 402, in well-known fashion. It will be clear to those skilled in the art, after reading this specification, how to make and use receiver 401.

Processor 402 is a general-purpose processor that is capable of receiving information from receiver 401, of executing instructions stored in memory 403, of reading data from and writing data into memory 403, of executing the tasks described below and with respect to FIGS. 8, 9, 11, and 12, and of transmitting information to transmitter 404. In some alternative embodiments of the present invention, processor 402 might be a special-purpose processor or might comprise a switching fabric. In either case, it will be clear to those skilled in the art, after reading this specification, how to make and use processor 402.

Memory 403 stores data and executable instructions, as is well-known in the art, and might be any combination of random-access memory (RAM), flash memory, disk drive memory, etc. It will be clear to those skilled in the art how to make and use memory 403.

Transmitter 404 receives information from processor 402 and transmits signals that encode this information to telecommunications terminal 301, network 303, and information database server 308, in well-known fashion. It will be clear to those skilled in the art, after reading this specification, how to make and use transmitter 404.

Figure 5:
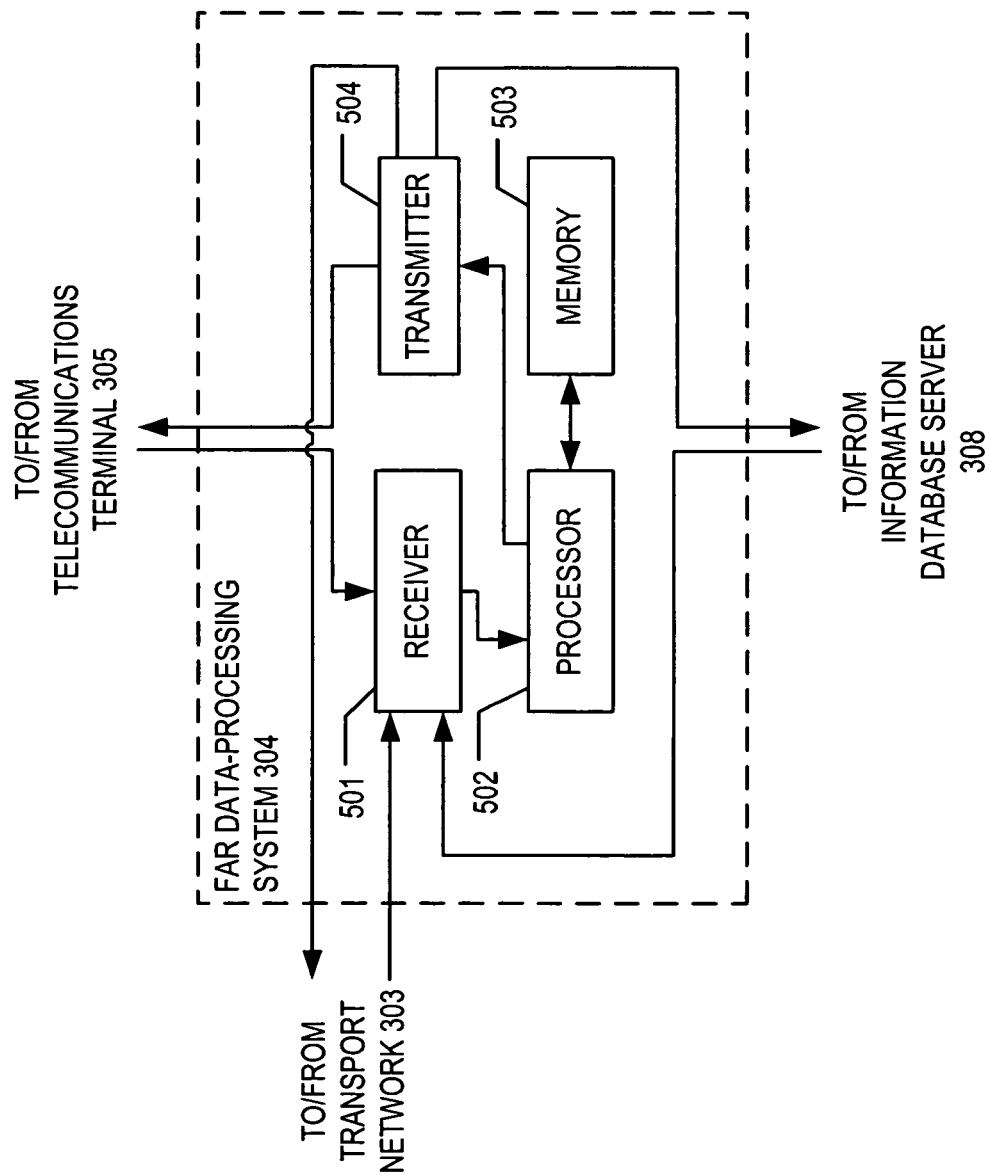
FIG. 5 depicts far data-processing system 304, in accordance with the illustrative embodiments of the present invention.

FIG. 5 depicts far data-processing system 304, in accordance with the illustrative embodiments of the present invention. Far data-processing system 304 comprises receiver 501, processor 502, memory 503, and transmitter 504, interconnected as shown.

Receiver 501 receives signals from telecommunications terminal 305, network 303, and information database server 308, and forwards the information encoded in these signals to processor 502, in well-known fashion. It will be clear to those skilled in the art, after reading this specification, how to make and use receiver 501.

Processor 502 is a general-purpose processor that is capable of receiving information from receiver 501, of executing instructions stored in memory 503, of reading data from and writing data into memory 503, of executing the tasks described below and with respect to FIGS. 8, 9, 11, and 12, and of transmitting information to transmitter 504. In some alternative embodiments of the present invention, processor 502 might be a special-purpose processor or might comprise a switching fabric. In either case, it will be clear to those skilled in the art, after reading this specification, how to make and use processor 502.

Memory 503 stores data and executable instructions, as is well-known in the art, and might be any combination of random-access memory (RAM), flash memory, disk drive memory, etc. It will be clear to those skilled in the art how to make and use memory 503.

Transmitter 504 receives information from processor 502 and transmits signals that encode this information to telecommunications terminal 305, network 303, and information database server 308, in well-known fashion. It will be clear to those skilled in the art, after reading this specification, how to make and use transmitter 504.

Figure 6:
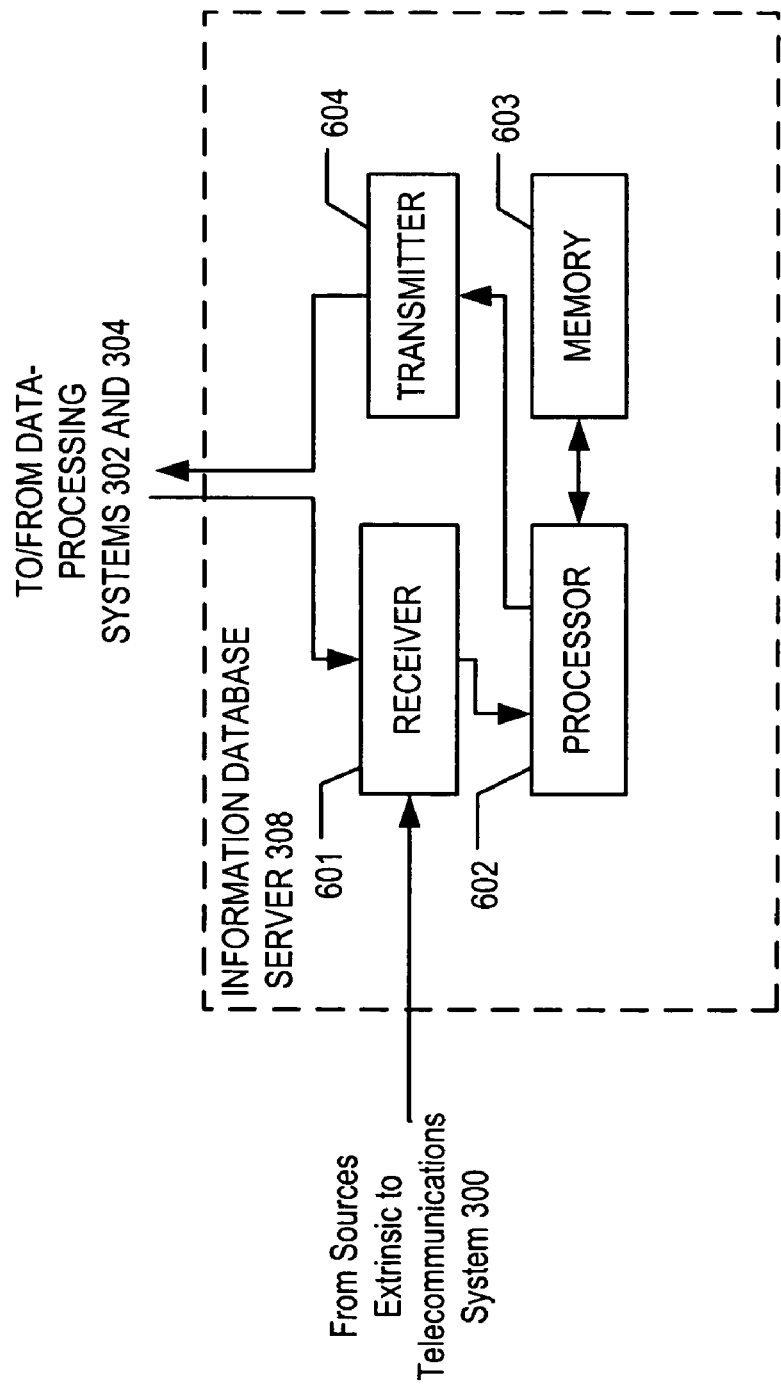
FIG. 6 depicts information database server 308, in accordance with the illustrative embodiments of the present invention.

FIG. 6 depicts information database server 308, in accordance with the illustrative embodiments of the present invention. Information database server 308 comprises receiver 601, processor 602, memory 603, and transmitter 604, interconnected as shown.

Receiver 601 receives signals from near data-processing system 302 or far data-processing system 304, or both, and forwards the information encoded in these signals to processor 602, in well-known fashion. It will be clear to those skilled in the art, after reading this specification, how to make and use receiver 601.

Processor 602 is a general-purpose processor that is capable of receiving information from receiver 601, of executing instructions stored in memory 603, of reading data from and writing data into memory 603, of executing the tasks described below and with respect to FIGS. 9, 10, 13, and 14, and of transmitting information to transmitter 604. In some alternative embodiments of the present invention, processor 602 might be a special-purpose processor. In either case, it will be clear to those skilled in the art, after reading this specification, how to make and use processor 602.

Memory 603 stores data and executable instructions, as is well-known in the art, and might be any combination of random-access memory (RAM), flash memory, disk drive memory, etc. The manner in which information is stored and organized in memory 603 is described below and with respect to FIG. 7. It will be clear to those skilled in the art, after reading this specification, how to make and use memory 603.

Transmitter 604 receives information from processor 602 and transmits signals that encode this information to near data-processing system 302 or far data-processing system 304, or both, in well-known fashion. It will be clear to those skilled in the art, after reading this specification, how to make and use transmitter 604.

Figure 7:
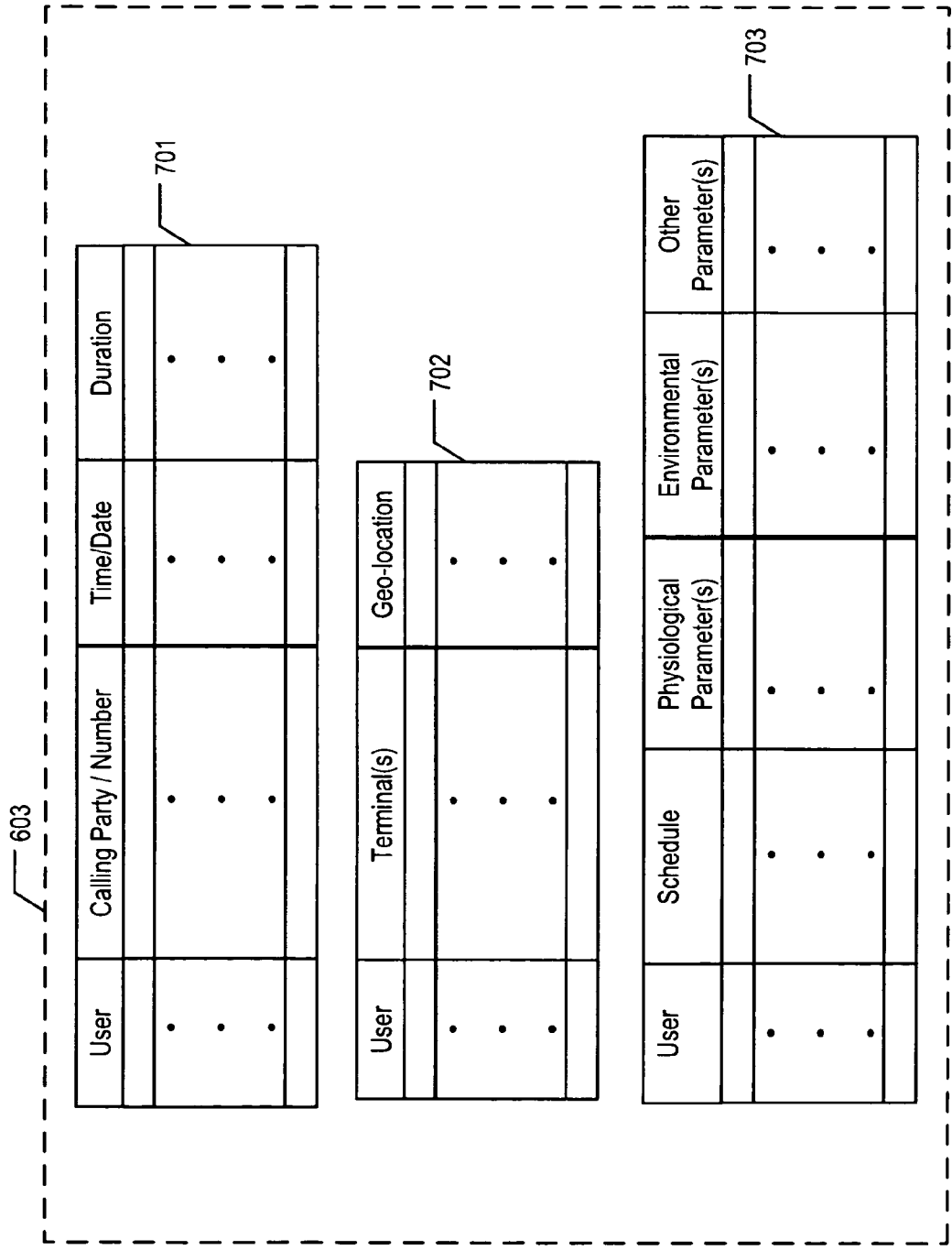
FIG. 7 depicts a block diagram of how information is stored and organized in memory 603 of information database server 308, in accordance with the illustrative embodiments of the present invention.

FIG. 7 depicts a block diagram of how information is stored and organized in memory 603 of information database server 308, in accordance with the illustrative embodiments of the present invention. The information that is stored in memory 603 comprises (i) information from other elements within telecommunications system 300, and (ii) information from sources that are extrinsic to telecommunications system 300.

The information received by memory 603 is stored and organized into call log 701, geo-location table 702, and extrinsic data table 703, in accordance with the illustrative embodiment of the present invention. As will be appreciated by those skilled in the art, in some other embodiments, the information contained in call log 701 and tables 702 and 703 might be stored and organized in an alternative manner.

Call log 701 is a record of call activity that comprises one or more of the following:
 i. All of the calls made and completed (i.e., "incoming calls") to telecommunications terminal 301;
 ii. All of the calls originating (i.e., "outgoing calls") from telecommunications terminal 301;
 iii. All of the calls made, but not completed (i.e., "missed calls"), to telecommunications terminal 301;
 iv. All of the calls made and completed to telecommunications terminal 305;
 v. All of the calls originating from telecommunications terminal 305; and
 vi. All of the calls made, but not completed, to telecommunications terminal 305.

Furthermore, call log 701 comprises call log information for user 306 or user 307, or both. For example, if user 306 uses more than one telecommunications terminal, call log 701 comprises information for the multiple telecommunications terminals of user 306.

Call log 701 as depicted in FIG. 7 illustrates a record of telephone calls. It will, however, be clear to those skilled in the art, after reading this specification, how to make and use a call log that provides a record of message activity, where the record of message activity is either integrated with or segregated from the record of telephone call activity. Examples of such messages include email messages, Short Message Service [SMS] messages, Multimedia Message Service [MMS] messages, Instant Messaging [IM] messages, etc. A call log that provides a record of message activity is also known as a "message log."

The call log information in call log 701 is provided, in well-known fashion, by near data-processing system 302 or far data-processing system 304, or both. Call logs are described in additional detail in co-pending U.S. patent application Ser. No. 10/881,908 and U.S. patent application Ser. No. 10/899,662, both of which are incorporated by reference.

As will be appreciated by those skilled in the art, although this specification describes call logs for two telecommunications terminals and two users, it will be clear how to make and use call logs for different numbers of terminals and users.

Geo-location table 702 is a record of the geo-location (i.e., the position in space) of each user or each telecommunications terminal of each user, or both. The geo-location of the user (or terminal) refers to the current location of the user. In accordance with the illustrative embodiments, information database server 308 receives geo-location data from data-processing systems 302 or 304, or both, in well-known fashion, and stores the data in an appropriate format (e.g., latitude and longitude, Cartesian coordinates, etc.). As will be appreciated by those skilled in the art, in some other embodiments of the present invention, information database server 308 might receive geo-location data from other elements of telecommunications system 300 instead of data-processing systems 302 and 304.

Extrinsic data table 703 stores a variety of information that is independent of the state of telecommunications system 300. Such information might include user schedules, environmental parameters or conditions at the terminals (e.g., temperature, ambient sound pressure, ambient luminosity, etc.), physiological parameters of terminal users (e.g., heart rate, respiration rate, blood pressure, body temperature, brain activity, etc.), and so forth.

Schedule information comprises one or more time calendrical time indications of one user's schedule or multiple users' schedules. The indications can be the time intervals during which a user (e.g., user 306, user 307, etc.) is occupied (e.g., by a meeting, a doctor's appointment, a vacation, etc.). For example, each interval is a time span such as "from 1:00 pm to 4:00 pm on Monday", "from 8:00 am to 1:00 pm on Wednesday", etc. A schedule might comprise periodic events (e.g., every Friday from 10:00 am to 11:00 am, etc.) in addition to individual time intervals, as is well known in the art. As will be appreciated by those skilled in the art, schedule information and entries can be received from a variety of extrinsic sources such as a groupware application (e.g., Lotus Notes®, etc.) hosted on a server, a calendar from a personal digital assistant (PDA), a desktop computer application, etc.

Physiological parameters for terminal users (e.g., user 306, user 307, etc.) are obtained by one or more monitors (e.g., a heart rate monitor, a body temperature monitor, etc.) and are transmitted to information database server 308 in well-known fashion. In some embodiments, a monitor might receive input from a user via one or more sensors coupled to a part of a user's body (e.g., finger, forehead, etc.), wherein the sensor transmits data to the terminal either by a wire, or wirelessly. In some other embodiments, a monitor might receive input from a user via one or more sensors located within the user's terminal, wherein the sensor receives physiological signals from the user when the user is holding the terminal.

Environmental parameters at a telecommunications terminal are obtained by one or more sensors embedded in the terminal (e.g., a thermometer, a sound-level meter, a photometer, etc.) and are transmitted to information database server 308 in well-known fashion.

Physiological parameters and environmental parameters are described in additional detail in co-pending U.S. application Ser. No. 10/262,798, which is incorporated by reference.

Additional extrinsic information such as user availability, user activity, real-time stock prices, portfolio balances, weather and sky conditions, etc. is received by information database server 308 in well-known fashion and stored in extrinsic data table 703 as "other parameters."

Memory 603 also stores and maintains, in well-known fashion, user identity information for user 306, user 307, and other users of telecommunications system 300. Examples of user identity information are name, address, phone number, account information, and so forth. Furthermore, memory 603 stores and maintains, in well-known fashion, information about one or more telecommunications terminals in telecommunications system 300. Examples of terminal information include capabilities present such as data rate and type, voice vocoders, text messaging, protocols, size of display, and so forth.

Figure 8:
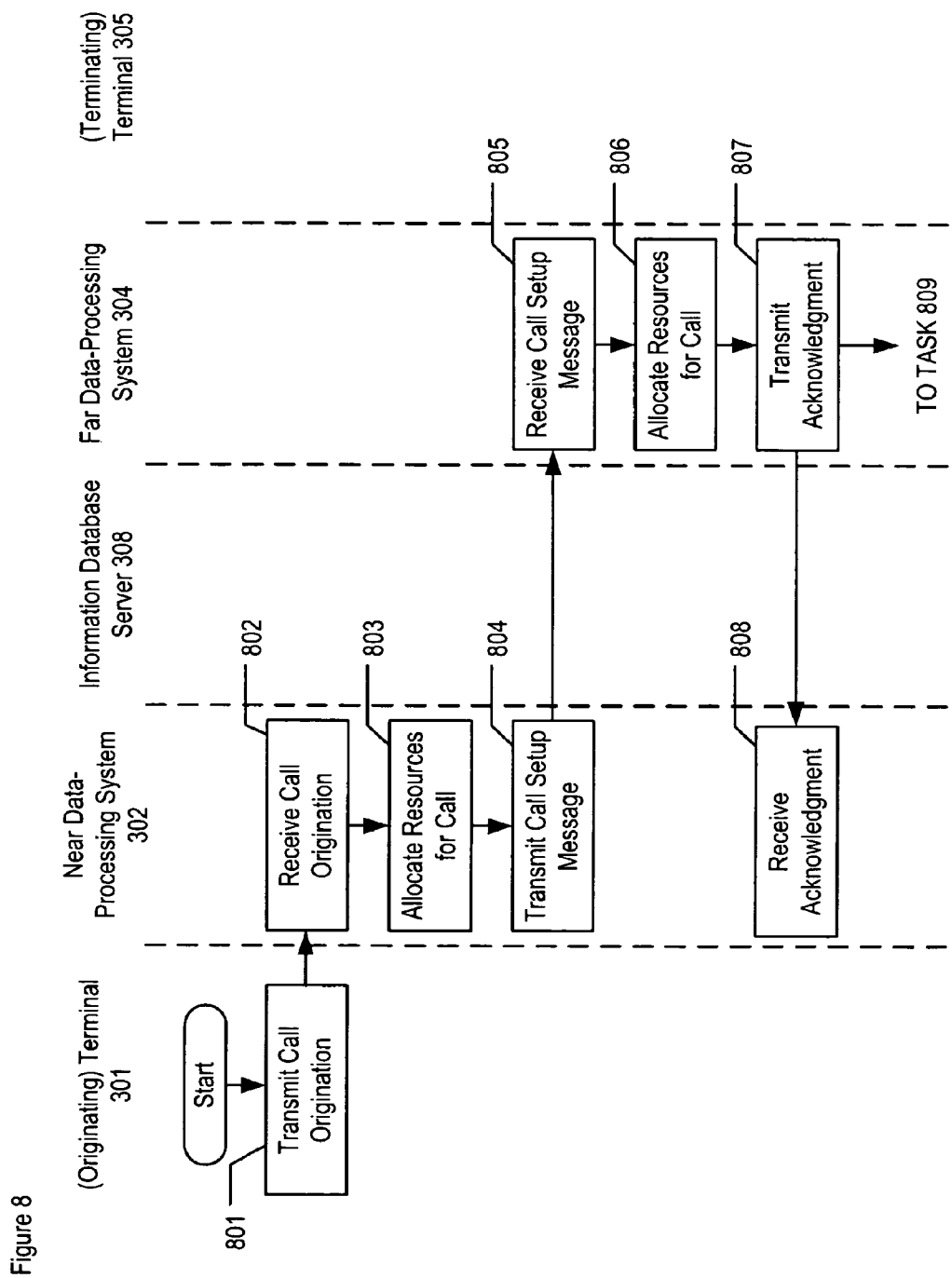
FIG. 8 depicts the first portion of a flow diagram of the salient tasks associated with generating, transmitting, and receiving a ringback signal, in accordance with the first illustrative embodiment of the present invention.
Figure 9:
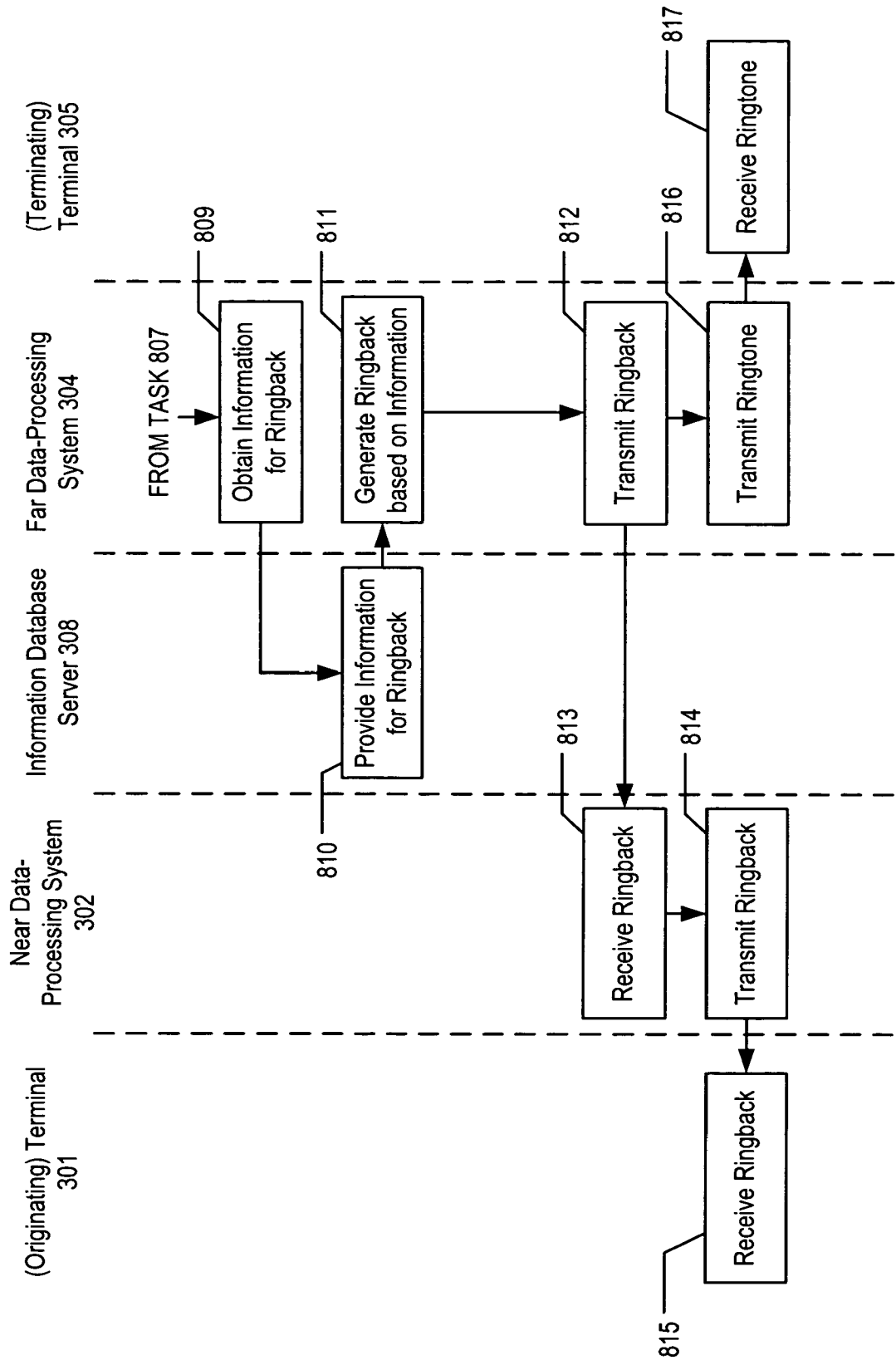
FIG. 9 depicts the second portion of a flow diagram of the salient tasks associated with generating, transmitting, and receiving a ringback signal, in accordance with the first illustrative embodiment of the present invention.

FIGS. 8 and 9 depict first and second portions of a flow diagram of the salient tasks associated with generating, transmitting, and receiving a ringback signal, in accordance with the first illustrative embodiment of the present invention. In the flow diagram, originating terminal 301 originates a call that is directed to terminating terminal 305. As described above, near data-processing system 302 is an originating data-processing system that directly supports terminal 301 with respect to call setup, and far data-processing system 304 is a terminating data-processing system that directly supports terminal 305. In the first illustrative embodiment of the present invention, far data-processing system 304 generates the ringback signal that is to be transmitted to terminal 301. It will be clear to those skilled in the art which tasks depicted in FIGS. 8 and 9 can be performed simultaneously or in a different order than that depicted.

At task 801 in FIG. 8, terminal 301 transmits, in well-known fashion, a signal that indicates a call origination. In this example, the call is directed to telecommunications terminal 305.

At task 802, near data-processing system 302 receives the call origination signal from terminal 301.

At task 803, near data-processing system 302 allocates resources for the call in well-known fashion. For example, if network 303 comprises T-1 lines, signaling transfer points, and circuit switches, near data-processing 302 signals to the infrastructure of network 303 to allocate the necessary T-1 transport resources and switching resources for the call.

At task 804, near data-processing system 302 transmits a signal that conveys call-setup information via network 303 to far data-processing system 304, in well-known fashion. The information conveyed by the call-setup signal comprises the originating terminal identifier and the terminating terminal identifier.

At task 805, far data-processing system 304 receives the call-setup information from near data-processing system 302.

At task 806, far data-processing system 304 allocates resources for the call in well-known fashion. For example, if terminal 305 is a cellular telephone, far data-processing system 304 allocates a trunk and a radio resource to handle the call at terminal 305.

At task 807, far data-processing system 304 transmits an acknowledgment via network 303 to near data-processing system 302, in well-known fashion. As is well-known in the art, such an acknowledgment indicates that the resources have been allocated successfully at the terminating end of the call routing path.

At task 808, near data-processing system 302 receives the acknowledgment.

In parallel with task 808, far data-processing system 304 obtains the information upon which the ringback signal is to be based at task 809 (depicted in FIG. 9), in accordance with the first illustrative embodiment of the present invention. Far data-processing system 304 transmits a request for the appropriate information (e.g., call log entries, geo-location, user identity, user schedule, etc.) to information database server 308. As will be appreciated by those skilled in the art, selecting the type of information upon which a ringback signal is to be based can be performed in a number of ways. For example, in some embodiments user 307 might specify ahead of time what type of information to consider in generating the ringback signals of subsequent incoming calls, while in some other embodiments the type of information might be specified by a network service provider.

At task 810, information database server 308 processes the request for information received from far data-processing system 304. Task 810 is described in detail below and with respect to FIG. 10.

At task 811, far data-processing system 304 generates a ringback signal based on the information received from information database server 308, in accordance with the first illustrative embodiment of the present invention. For example, if the ringback signal is based on the current weather at user 307's geo-location, the generated ringback signal might be an audio track that imparts the information that it is sunny and 58 degrees in Chicago.

As will be appreciated by those skilled in the art, selecting (i) the type of ringback signal (e.g., musical composition, image, etc.) and (ii) the properties of the ringback signal (e.g., volume, brightness, etc.) to consider at task 811 can be performed in a number of ways. For example, in some embodiments user 307 might specify ahead of time the type and properties to consider in generating the ringback signals of subsequent incoming calls, while in some other embodiments the type and properties might be specified by a network service provider.

Task 811 is described in detail below and with respect to FIG. 11.

At task 812, far data-processing system 304 transmits the ringback signal to near data-processing system 302. In accordance with the first illustrative embodiment of the present invention, the ringback signal is transmitted as a signal on the traffic path (e.g., an audio waveform, a data file comprising text or an image bitmap, etc.). In some alternative embodiments, the ringback is transmitted on a signaling path or data path (e.g., an Internet protocol network, etc.).

At task 813, near data-processing system 302 receives the ringback signal.

At task 814, near data-processing system 302 transmits the ringback signal to terminal 301.

At task 815, terminal 301 receives the ringback signal.

In parallel with tasks 814 and 815, far data-processing system 304 transmits at task 816 a ringtone signal to terminal 305 to notify user 307 of the incoming call.

At task 817, terminal 305 receives the ringtone and plays it to user 307.

Figure 10:
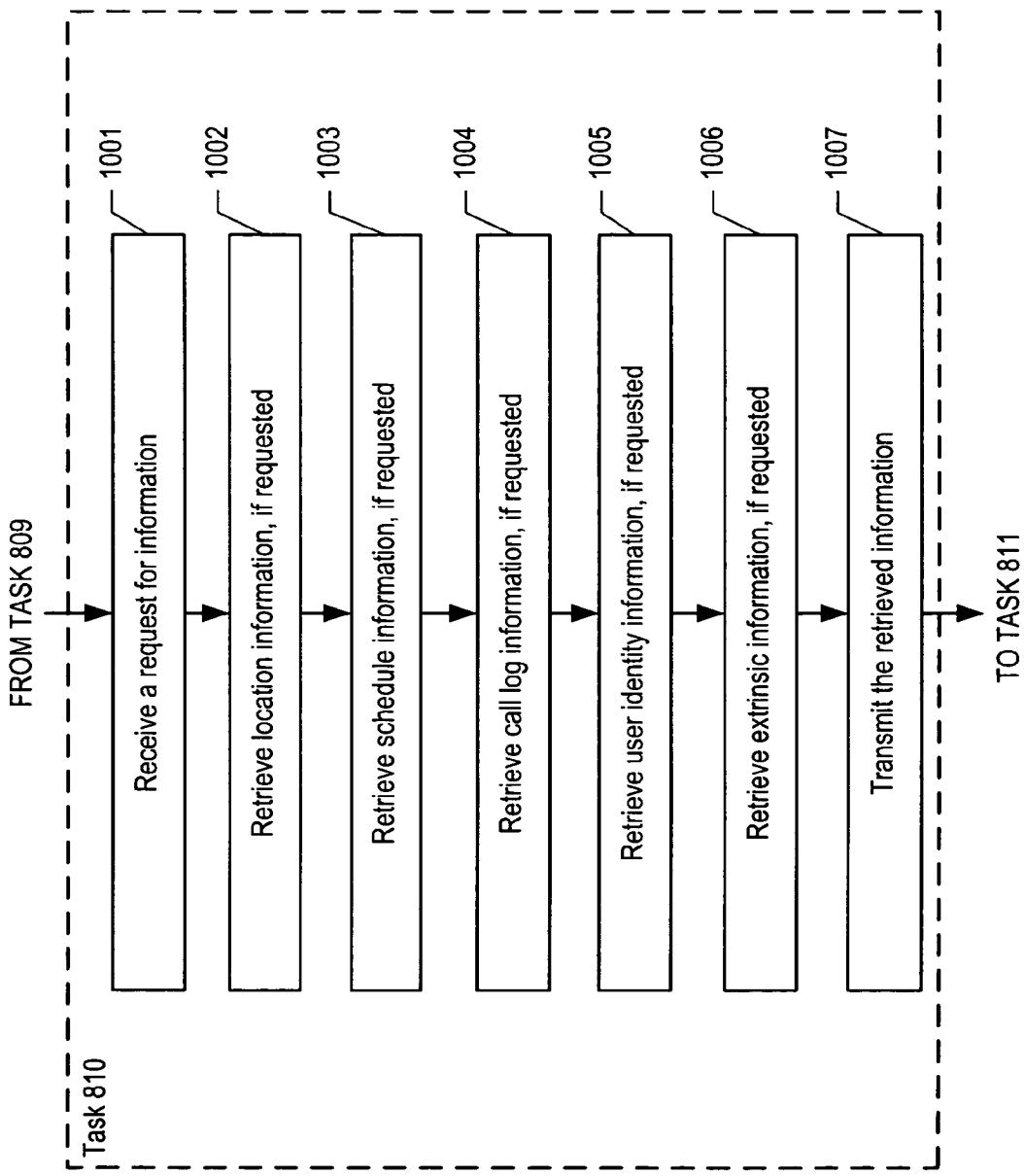
FIG. 10 depicts a flow diagram of the salient tasks associated with providing a ringback, in accordance with the first illustrative embodiment of the present invention.

FIG. 10 depicts a flow diagram of the salient tasks associated with providing a ringback by information database server 308, in accordance with the first illustrative embodiment of the present invention. It will be clear to those skilled in the art which tasks depicted in FIG. 10 can be performed simultaneously or in a different order than that depicted.

At task 1001, information database server 308 receives a request R for information from far data-processing system 304, in well-known fashion.

At task 1002, information database server 308 retrieves location information from memory 603, if requested by request R, in well-known fashion.

At task 1003, information database server 308 retrieves schedule information from memory 603, if requested by request R, in well-known fashion.

At task 1004, information database server 308 retrieves call log information from memory 603, if requested by request R, in well-known fashion.

At task 1005, information database server 308 retrieves user identity information or terminal information from memory 603, if requested by request R, in well-known fashion.

At task 1006, information database server 308 retrieves extrinsic information from memory 603, if requested by request R, in well-known fashion.

At task 1007, information database server 308 transmits the retrieved information to far data-processing system 304, in well-known fashion.

Figure 11:
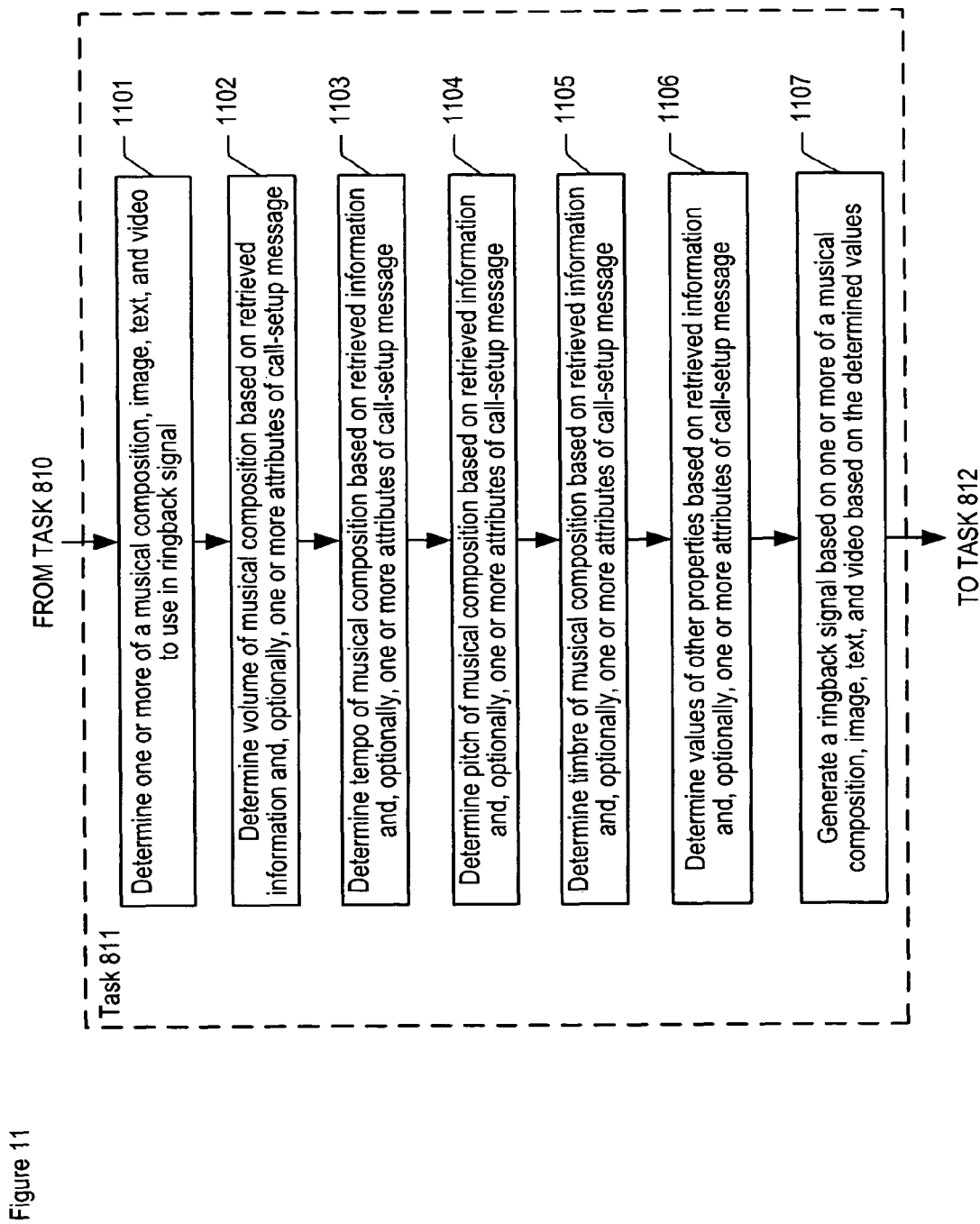
FIG. 11 depicts a flow diagram of the salient tasks associated with generating a ringback, in accordance with the first illustrative embodiment of the present invention.

FIG. 11 depicts a detailed flowchart of task 811 in accordance with the first illustrative embodiment of the present invention. It will be clear to those skilled in the art which tasks depicted in FIG. 11 can be performed simultaneously or in a different order than that depicted.

At task 1101, far data-processing system 304 determines what musical composition, image, text, video, etc. to provide as a ringback signal to user 306 of terminal 301. In some embodiments, all users who place a call to telecommunications terminal 305 might receive the same ringback, while in some other embodiments, each individual caller might have an associated musical composition, image, etc., while in still some other embodiments the ringback might be independent of the caller. In accordance with the first illustrative embodiment of the present invention, these ringback "rules" are specified by the user of telecommunications terminal 305 and uploaded to memory 503.

At task 1102, far data-processing system 304 determines the volume of the musical composition based on the information provided at task 810, in accordance with the first illustrative embodiment. Optionally, far data-processing system 304 also determines the volume based on one or more attributes of the call-setup message such as the identity of terminal 301, the location of terminal 301, and so forth. As will be appreciated by those skilled in the art, the logic by which data-processing system 304 sets the volume of the musical composition might be specified by a network service provider, by the user of telecommunications terminal 305 and uploaded to data-processing system 304, etc.

At task 1103, far data-processing system 304 determines the tempo of the musical composition based on (i) the information provided at task 810 and (ii) optionally, one or more attributes of the call-setup message.

At task 1104, far data-processing system 304 determines the pitch (i.e., key signature) of the musical composition based on (i) the information provided at task 810 and (ii) optionally, one or more attributes of the call-setup message.

At task 1105, far data-processing system 304 determines the timbre (e.g., the musical instrument playing the composition, etc.) of the musical composition based on (i) the information provided at task 810 and (ii) optionally, one or more attributes of the call-setup message.

At task 1106, far data-processing system 304 determines (i) the values of additional properties of the musical composition and (ii) the values of properties of any image, text, or video selected at task 1101. Additional properties of musical compositions might include harmony, rhythm, gender for vocal music, language for vocal music, and so forth. Image and video properties might include brightness, contrast, resolution, hue, saturation, position on a telecommunications terminal display, speed of animation, and so forth. Text properties might include font style (e.g., bold, italics, etc.), font size, text color, background color, position on the terminal display, dynamic behavior, speed of dynamic behavior, and so forth. The property values are based on (i) the information provided at task 810 and (ii) optionally, one or more attributes of the call-setup message.

At task 1107, far data-processing system 304 generates a ringback signal based on one or more of a musical composition, image, text, and video, and based on the determined property values. After task 1107, execution continues at task 812.

Figure 12:
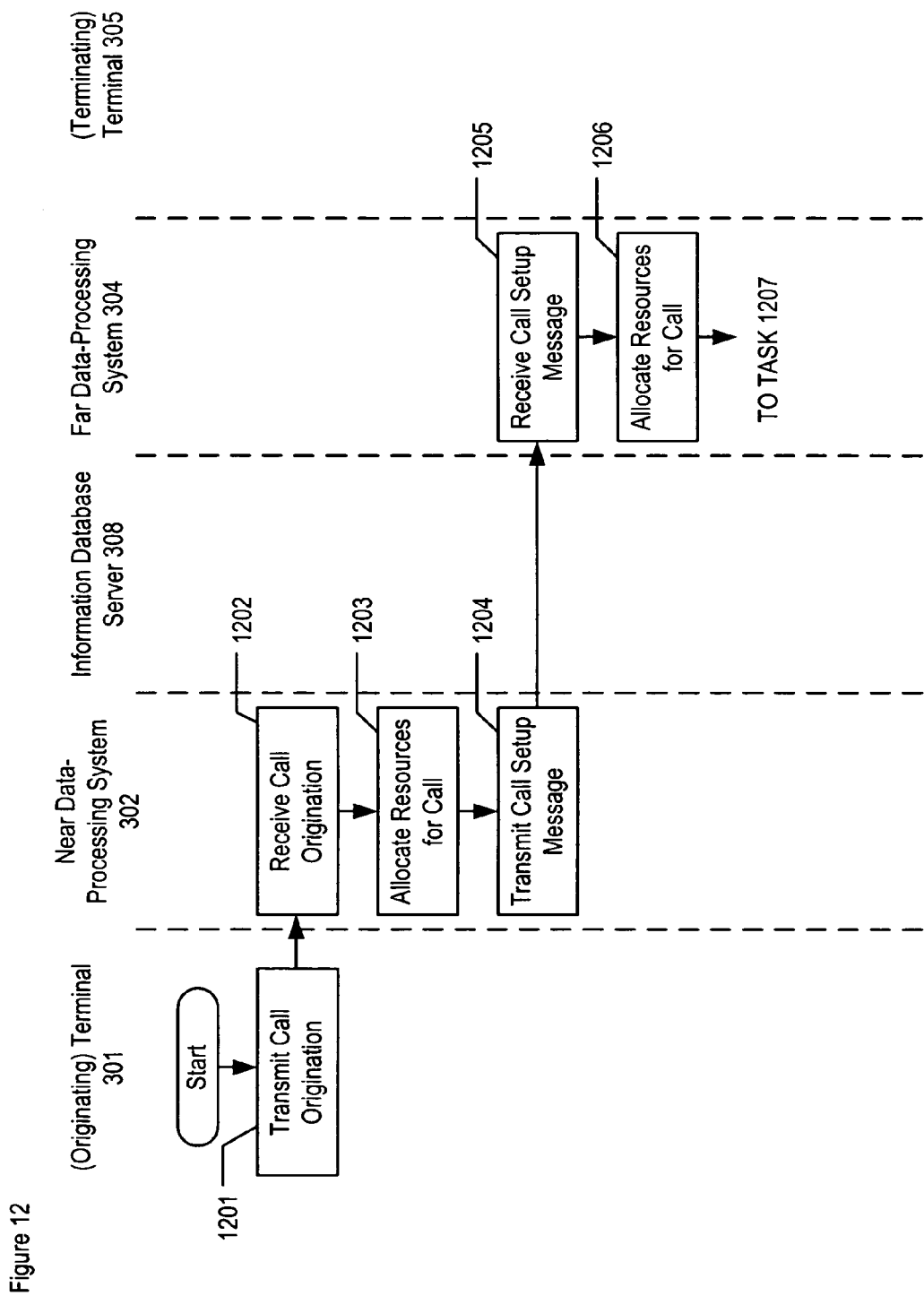
FIG. 12 depicts the first portion of a flow diagram of the salient tasks associated with generating, transmitting, and receiving a ringback signal, in accordance with the second illustrative embodiment of the present invention.
Figure 13:
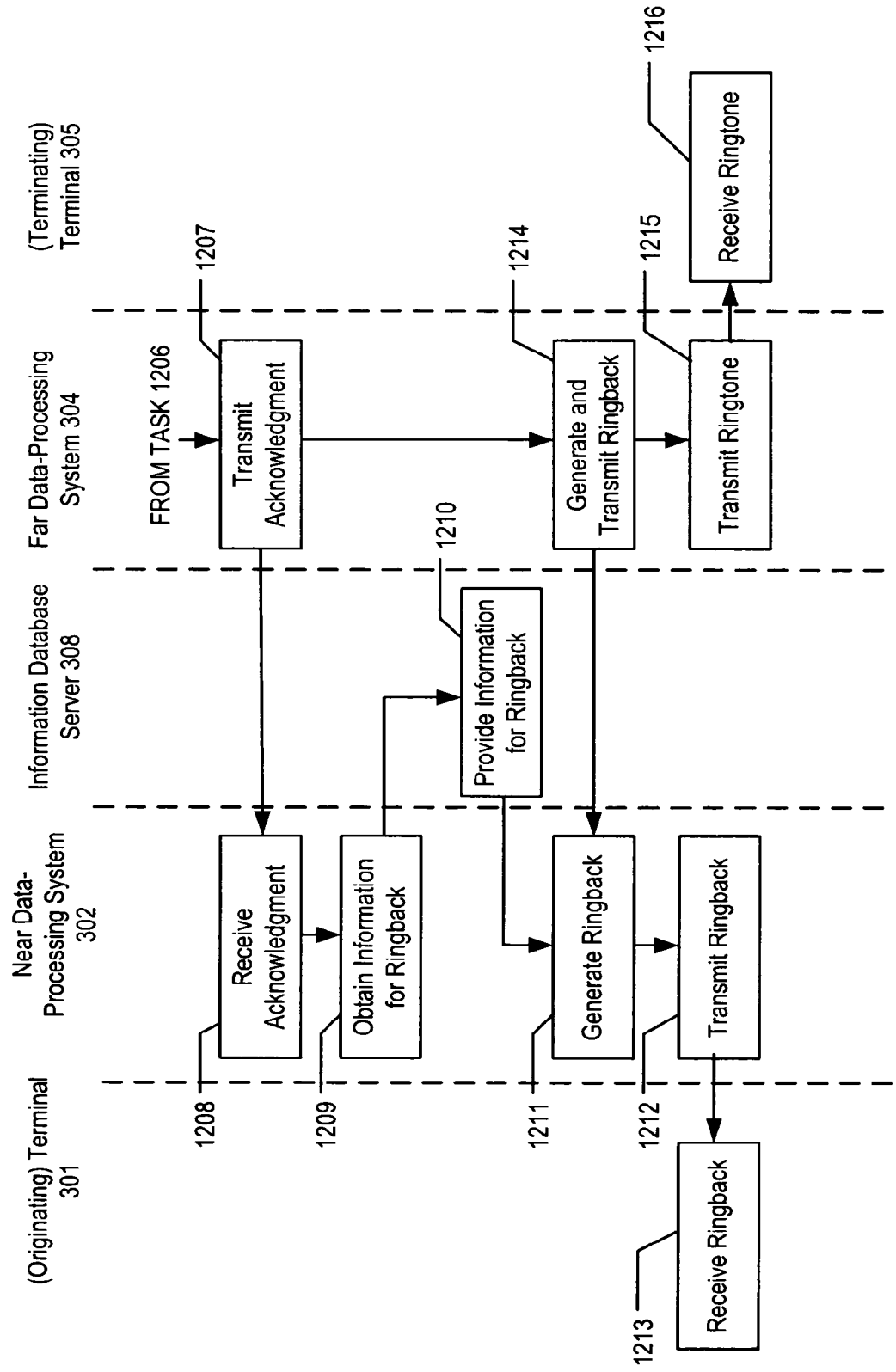
FIG. 13 depicts the second portion of a flow diagram of the salient tasks associated with generating, transmitting, and receiving a ringback signal, in accordance with the second illustrative embodiment of the present invention.

FIGS. 12 and 13 depict first and second portions of a flow diagram of the salient tasks associated with generating, transmitting, and receiving a ringback signal, in accordance with the second illustrative embodiment of the present invention. In the second illustrative embodiment, near data-processing system 302 generates a ringback signal that is to be transmitted to originating terminal 301. It will be clear to those skilled in the art which tasks depicted in FIGS. 12 and 13 can be performed simultaneously or in a different order than that depicted.

At task 1201 of FIG. 12, terminal 301 transmits, in well-known fashion, a signal that indicates a call origination. In this example, the call is directed to telecommunications terminal 305.

At task 1202, near data-processing system 302 receives the call origination signal from terminal 301.

At task 1203, near data-processing system 302 allocates resources for the call in well-known fashion. For example, if network 303 comprises T-1 lines, signaling transfer points, and circuit switches, near data-processing 302 signals to the infrastructure of network 303 to allocate the necessary T-1 transport resources and switching resources for the call.

At task 1204, near data-processing system 302 transmits a signal that conveys call-setup information via network 303 to far data-processing system 304, in well-known fashion. The information conveyed by the call-setup signal comprises the originating terminal identifier and the terminating terminal identifier.

At task 1205, far data-processing system 304 receives the call-setup information from near data-processing system 302.

At task 1206, far data-processing system 304 allocates resources for the call in well-known fashion. For example, if terminal 305 is a cellular telephone, far data-processing system 304 allocates a trunk and a radio resource to handle the call at terminal 305.

At task 1207, which is depicted in FIG. 13, far data-processing system 304 transmits an acknowledgment to near data-processing system 302, in well-known fashion. As is well-known in the art, such an acknowledgment indicates that the resources have been allocated successfully at the terminating end of the call routing path.

At task 1208, near data-processing system 302 receives the acknowledgment.

At task 1209, near data-processing system 302 obtains the information upon which the ringback signal is to be based, in accordance with the second illustrative embodiment of the present invention. Near data-processing system 302 transmits a request for the relevant information (e.g., call log entries, geo-location, user identity, user schedule, etc.) to information database server 308. As will be appreciated by those skilled in the art, selecting the type of information upon which a ringback signal is to be based can be performed in a number of ways. For example, in some embodiments user 306 might specify ahead of time what type of information to consider in generating ringback signals, while in some other embodiments the type of information might be specified by a network service provider.

At task 1210, information database server 308 processes the request for information received from near data-processing system 302. Task 1210 is described in detail below and with respect to FIG. 14.

At task 1211, near data-processing system 302 generates a ringback signal based on the information received from information database server 308, in accordance with the second illustrative embodiment of the present invention. For example, if the ringback signal is based on user 306's identity, the generated ringback signal might be an audio track of user 306's favorite song. In some embodiments, user 306 might specify the content of the ringback signal, as well as one or more properties of the ringback signal (e.g., tempo, volume, etc.), via user preferences, rules, and so forth.

As will be appreciated by those skilled in the art, selecting (i) the type of ringback signal (e.g., musical composition, image, etc.) and (ii) the properties of the ringback signal (e.g., volume, brightness, etc.) to consider at task 1211 can be performed in a number of ways. For example, in some embodiments user 306 might specify ahead of time the type and properties to consider in generating the ringback signals of subsequent incoming calls, while in some other embodiments the type and properties might be specified by a network service provider.

Near data-processing system 302 also receives the ringback signal generated by far data-processing system 304. The received ringback is generated as described below and with respect to task 1214. Near data-processing system 302 can (i) mute the received ringback to prevent user 306 from hearing it or (ii) consider the received ringback for the purpose of generating the ringback signal at task 1211. In some alternative embodiments, near data-processing system 302 generates its ringback signal only after receiving the ringback from far data-processing system 304.

Task 1211 is described in detail below and with respect to FIG. 15.

At task 1212, near data-processing system 302 transmits the ringback signal to terminal 301. In some alternative embodiments, near data-processing system 302 also transmits to terminal 301 the ringback received from far data-processing system 304. If near data-processing system 302 also transmits the received ringback, system 302 might transmit its generated ringback signal and the received ringback concurrently or at different times.

At task 1213, terminal 301 receives the ringback signal.

In parallel with tasks 1209 through 1213, far data-processing system 304 generates and transmits at task 1214 a ringback signal. As will be appreciated by those skilled in the art, far data-processing system 304 can generate and transmit the ringback signal by using either (i) a method well-known in the art or (ii) the method in accordance with the first illustrative embodiment of the present invention.

At task 1215, far data-processing system transmits a ringtone to terminal 305 to notify user 307 of the incoming call.

At task 1216, terminal 305 receives the ringtone and plays it to user 307.

Figure 14:
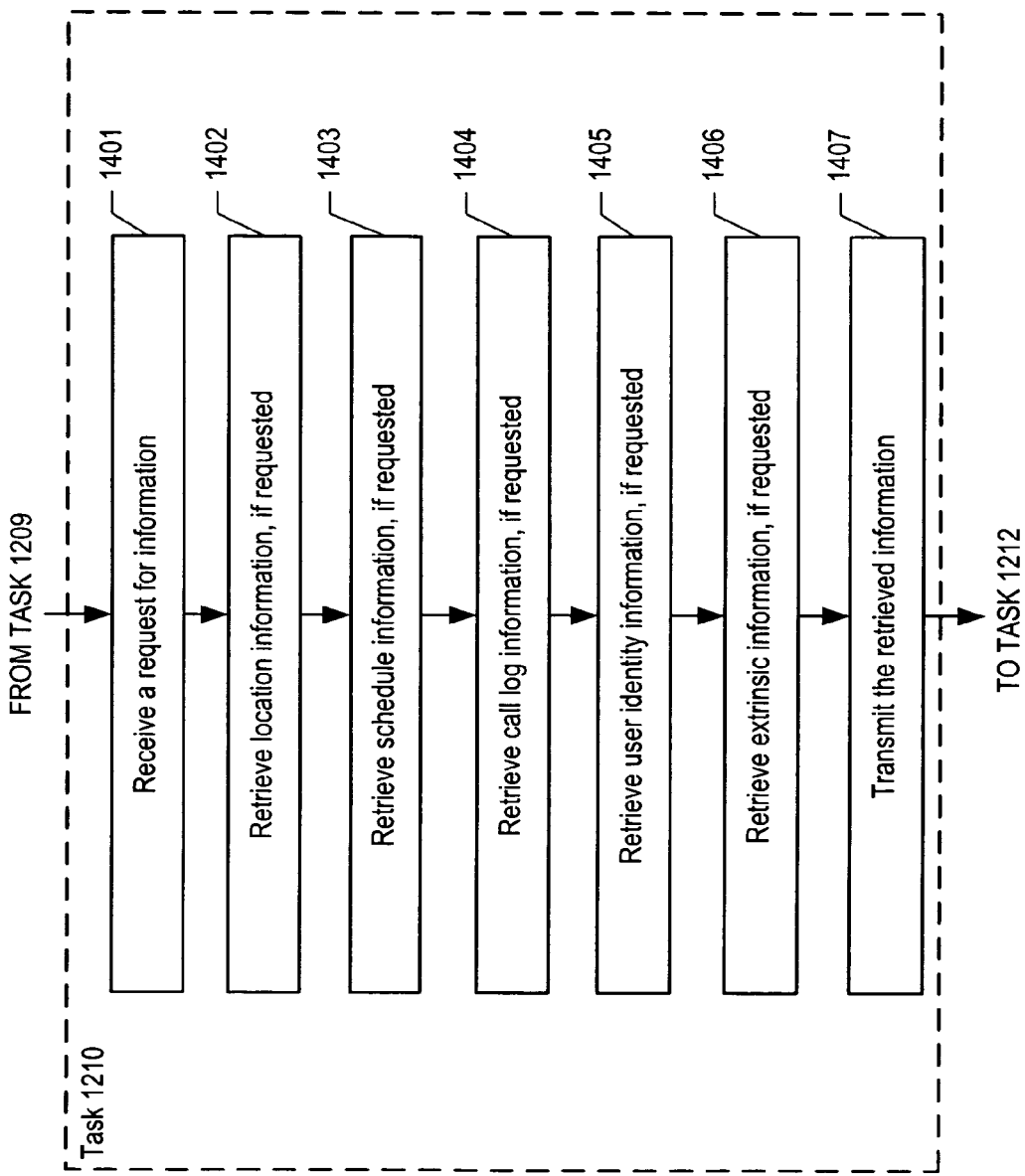
FIG. 14 depicts a flow diagram of the salient tasks associated with providing a ringback, in accordance with the second illustrative embodiment of the present invention.

FIG. 14 depicts a flow diagram of the salient tasks associated with providing a ringback by information database server 308, in accordance with the second illustrative embodiment of the present invention. It will be clear to those skilled in the art which tasks depicted in FIG. 14 can be performed simultaneously or in a different order than that depicted.

At task 1401, information database server 308 receives a request R for information from near data-processing system 302, in well-known fashion.

At task 1402, information database server 308 retrieves location information from memory 603, if requested by request R, in well-known fashion.

At task 1403, information database server 308 retrieves schedule information from memory 603, if requested by request R, in well-known fashion.

At task 1404, information database server 308 retrieves call log information from memory 603, if requested by request R, in well-known fashion.

At task 1405, information database server 308 retrieves user identity information or terminal information from memory 603, if requested by request R, in well-known fashion.

At task 1406, information database server 308 retrieves extrinsic information from memory 603, if requested by request R, in well-known fashion.

At task 1407, information database server 308 transmits the retrieved information to near data-processing system 302, in well-known fashion.

Figure 15:
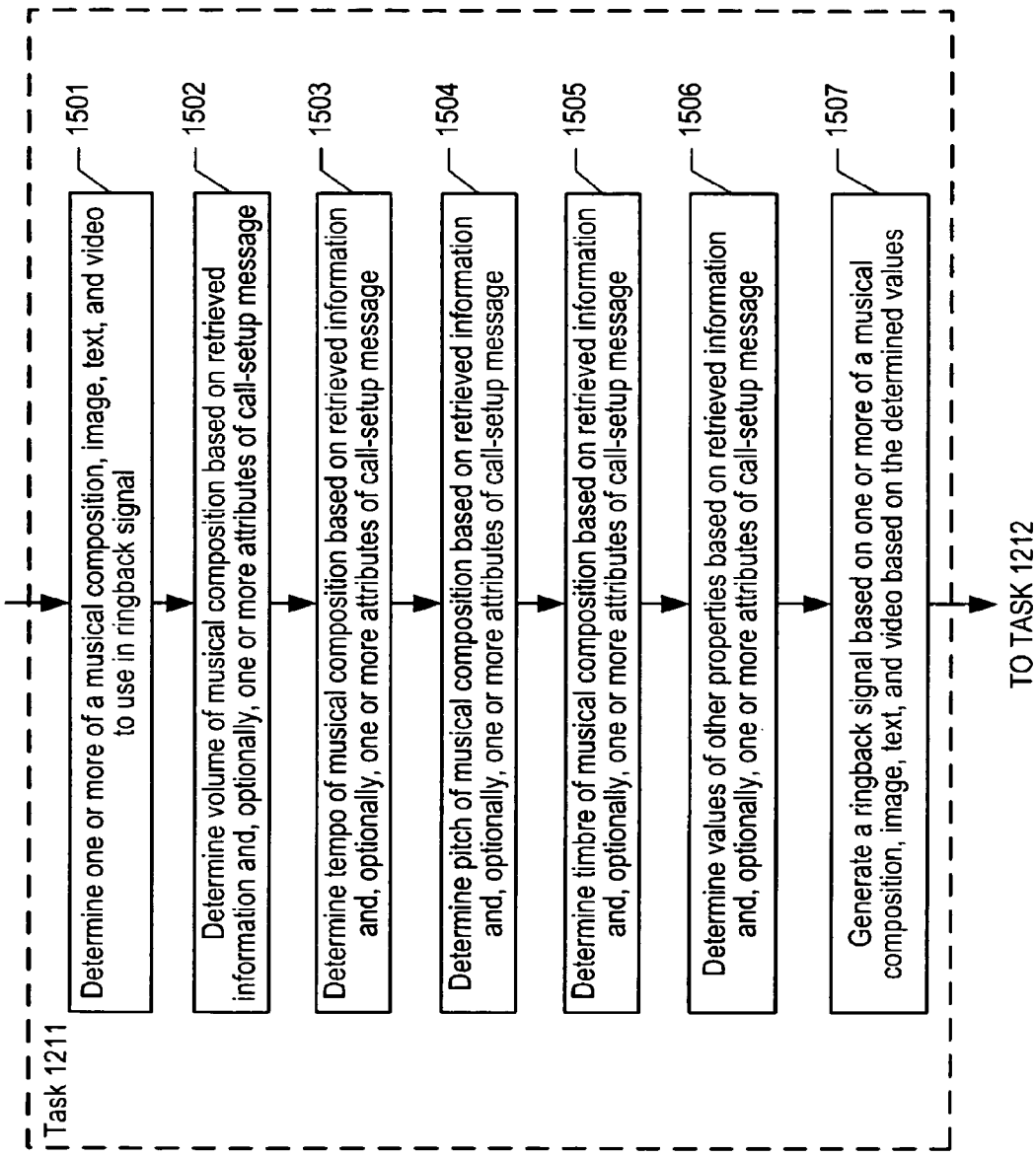
FIG. 15 depicts a flow diagram of the salient tasks associated with generating a ringback, in accordance with the second illustrative embodiment of the present invention.

FIG. 15 depicts a detailed flowchart of task 1211 in accordance with the second illustrative embodiment of the present invention. It will be clear to those skilled in the art which tasks depicted in FIG. 15 can be performed simultaneously or in a different order than that depicted.

At task 1501, near data-processing system 302 determines what musical composition, image, text, video, etc. to provide as a ringback signal to user 306 of terminal 301. In some embodiments, all users who place a call to telecommunications terminal 305 might receive the same ringback, while in some other embodiments, each individual caller might have an associated musical composition, image, etc., while in still some other embodiments the ringback might be independent of the caller. In accordance with the second illustrative embodiment of the present invention, these ringback "rules" are specified by the user of telecommunications terminal 301 and uploaded to memory 403.

At task 1502, near data-processing system 302 determines the volume of the musical composition based on the information provided at task 1210, in accordance with the second illustrative embodiment. Optionally, near data-processing system 302 also determines the volume based on one or more attributes of the call-setup message such as the identity of terminal 301, the location of terminal 301, and so forth. As will be appreciated by those skilled in the art, the logic by which near data-processing system 302 sets the volume of the musical composition might be specified by a network service provider, by the user of telecommunications terminal 301 and uploaded to near data-processing system 302, etc.

At task 1503, near data-processing system 302 determines the tempo of the musical composition based on (i) the information provided at task 1210 and (ii) optionally, one or more attributes of the call-setup message.

At task 1504, near data-processing system 302 determines the pitch (i.e., key signature) of the musical composition based on (i) the information provided at task 1210 and (ii) optionally, one or more attributes of the call-setup message.

At task 1505, near data-processing system 302 determines the timbre (e.g., the musical instrument playing the composition, etc.) of the musical composition based on (i) the information provided at task 1210 and (ii) optionally, one or more attributes of the call-setup message.

At task 1506, near data-processing system 302 determines (i) the values of additional properties of the musical composition and (ii) the values of properties of any image, text, or video selected at task 1501. Additional properties of musical compositions might include harmony, rhythm, gender for vocal music, language for vocal music, and so forth. Image and video properties might include brightness, contrast, resolution, hue, saturation, position on a telecommunications terminal display, speed of animation, and so forth. Text properties might include font style (e.g., bold, italics, etc.), font size, text color, background color, position on the terminal display, dynamic behavior, speed of dynamic behavior, and so forth. The property values are based on (i) the information provided at task 1210 and (ii) optionally, one or more attributes of the call-setup message.

At task 1507, near data-processing system 302 generates a ringback signal based on one or more of: a musical composition, image, text, and video; the determined property values; and optionally, on the ringback signal received from far data-processing system 304 (i.e., the "far" ringback signal). In some embodiments, the ringback signal generated at task 1507 might comprise the far ringback signal and an additional signal (e.g., speech superimposed over instrumental music, etc.). In some other embodiments, the ringback signal generated at task 1507 might not include the far ringback signal—i.e., the far ringback signal is muted, or equivalently, a new ringback signal is substituted for the far ringback signal. After task 1507, execution continues at task 1212.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    receiving, at a data-processing system, a call-setup signal for a call that is directed to a communications terminal;
    receiving, at the data processing system, the value of a physiological parameter of a user of the communications terminal, wherein:
        (i) the value of the physiological parameter is obtained from a sensor that monitors one of an anatomical organ and an anatomical system of the user, and
        (ii) the physiological parameter measures a characteristic of one of the anatomical organ and the anatomical system; and
    modifying, at the data processing system, a property of a ring-back signal for the call, wherein:
        (i) the property is one of pitch, timbre, and tempo, and
        (ii) the property is modified based on the value of the physiological parameter.

2. The method of claim 1 wherein the physiological sensor is located within the communications terminal.

3. The method of claim 1 wherein the physiological parameter is respiration rate.

4. The method of claim 1 wherein the physiological parameter is blood pressure.

5. The method of claim 1 wherein physiological parameter is one of heart rate and body temperature.

6. A method comprising:
    receiving at a data processing system a call-setup signal for a call that is directed to a communications terminal; and
    selecting, at the data processing system, a gender for a voice in which words in a vocal composition are pronounced;
    wherein the vocal composition is used as a ring-back signal for the call;
    wherein the selection of the gender is based on a physiological parameter of a user of the communications terminal;
    wherein the physiological parameter is obtained from a sensor that monitors one of an anatomical organ and an anatomical system of the user; and
    wherein the physiological parameter measures a characteristic of one of the anatomical organ and the anatomical system of the user.

7. The method of claim 6 wherein the selection of the gender is also based on identity of the user of the communications terminal.

8. The method of claim 6 wherein the selection of the gender is also based on identity of a user who places the call.

9. The method of claim 6 wherein the selection of the gender is also based on the contents of a schedule that has an entry for the user of the communications terminal.

10. The method of claim 6 wherein the selection of the gender is also based on an environmental parameter.

* * * * *